United States Patent
Devarayanigari et al.

(10) Patent No.: US 9,974,021 B2
(45) Date of Patent: May 15, 2018

(54) METHOD FOR REDUCING BATTERY POWER CONSUMPTION OF USER EQUIPMENT (UE) DURING MANUAL CSG SELECTION

(71) Applicant: Samsung Electronics Co., Ltd., Suwon-si, Gyeonggi-do (KR)

(72) Inventors: Pavan Kumar Devarayanigari, Bangalore (IN); Nitesh Pushpak Shah, Bangalore (IN); Prasad Basavaraj Dandra, Bangalore (IN); Vijay Ganesh Surisetty, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/111,984

(22) PCT Filed: Jan. 19, 2015

(86) PCT No.: PCT/KR2015/000510
§ 371 (c)(1),
(2) Date: Jul. 15, 2016

(87) PCT Pub. No.: WO2015/108376
PCT Pub. Date: Jul. 23, 2015

(65) Prior Publication Data
US 2016/0337972 A1  Nov. 17, 2016

(30) Foreign Application Priority Data

Jan. 20, 2014 (IN) .............................. 236/CHE/2014

(51) Int. Cl.
*H04W 52/02* (2009.01)
*H04W 48/20* (2009.01)
*H04W 84/04* (2009.01)

(52) U.S. Cl.
CPC ....... *H04W 52/0225* (2013.01); *H04W 48/20* (2013.01); *H04W 84/045* (2013.01); *Y02B 60/50* (2013.01)

(58) Field of Classification Search
CPC ..... H04W 48/02; H04W 48/08; H04W 48/20; H04W 52/02; H04W 52/0209; H04W 52/0264; H04W 4/08; H04W 84/045
(Continued)

(56) References Cited

U.S. PATENT DOCUMENTS 7,848,756 B2    12/2010  Nader et al.
2009/0305699 A1*  12/2009  Deshpande ........... H04W 48/16
                                                         455/434
(Continued)

FOREIGN PATENT DOCUMENTS

EP    2 299 755 A1    3/2011

OTHER PUBLICATIONS

PLMN Change in Manual CSG Selection, XP 050355948, Jun. 30, 2009.
(Continued)

*Primary Examiner* — Duc M Nguyen
(74) *Attorney, Agent, or Firm* — Jefferson IP Law, LLP

(57) ABSTRACT

A method for connecting to a Registered Public Land Mobile Network (RPLMN) after receiving an accept message with limited service from a user selected CSG cell, which is associated to a different PLMN than the RPLMN during manual CSG selection mode is disclosed. The method includes connecting to the RPLMN based on the availability of the user selected CSG cell in UTRAN. If the user selected CSG cell is not available in UTRAN, then the method includes connecting to the RPLMN by the UE using the stored duplicate value of the RPLMN. If the user selected CSG cell is available in UTRAN, then the method
(Continued)

includes sending an ATTACH request to the user selected CSG cell without disabling the EUTRA capabilities. If the ATTACH request is failed, then the method includes connecting to the RPLMN using the stored duplicate value of the RPLMN.

15 Claims, 4 Drawing Sheets

(58) Field of Classification Search
USPC ............ 455/574, 432, 1, 432.2, 434, 435.1, 455/435.2, 436, 437
See application file for complete search history.

(56) References Cited

U.S. PATENT DOCUMENTS

| | | | |
|---|---|---|---|
| 2010/0110987 A1* | 5/2010 | Subramanian | H04W 48/18 370/328 |
| 2012/0064889 A1* | 3/2012 | Tiwari | H04W 8/186 455/434 |
| 2012/0083245 A1* | 4/2012 | Adjakple | H04W 4/08 455/411 |
| 2012/0157095 A1 | 6/2012 | Fodor et al. | |
| 2012/0218889 A1* | 8/2012 | Watfa | H04W 60/04 370/230 |
| 2013/0003699 A1 | 1/2013 | Liu et al. | |
| 2013/0077515 A1 | 3/2013 | Jung et al. | |
| 2013/0203450 A1* | 8/2013 | Mochizuki | H04W 68/02 455/458 |
| 2013/0281064 A1* | 10/2013 | Hedberg | H04W 74/002 455/411 |
| 2015/0024760 A1* | 1/2015 | Zheng | H04W 36/30 455/444 |
| 2015/0056956 A1* | 2/2015 | Adjakple | H04W 4/08 455/411 |
| 2015/0094062 A1* | 4/2015 | Niemi | H04W 60/00 455/435.2 |
| 2015/0264604 A1* | 9/2015 | Devarayanigari | H04W 36/0022 370/331 |
| 2015/0289114 A1* | 10/2015 | Dandra | H04W 4/08 370/329 |
| 2016/0029282 A1* | 1/2016 | Lee | H04W 36/14 370/332 |
| 2016/0242138 A1* | 8/2016 | Basavaraj | H04W 48/20 |
| 2016/0330664 A1* | 11/2016 | Liu | H04W 8/082 |
| 2016/0337972 A1* | 11/2016 | Devarayanigari | H04W 48/20 |
| 2016/0373977 A1* | 12/2016 | Sripada | H04W 36/04 |

OTHER PUBLICATIONS

Inter-RAT Manual CSG ID selection, XP050420852, Jan. 11, 2010.
Manual CSG selection across PLMN in Rel-9", XP050391245, Nov. 1, 2009.
Best cell selection for Manual CSG selection (UTRA and eUTRA ), XP050450892, Aug. 22, 2008.

* cited by examiner

[Fig. 1]
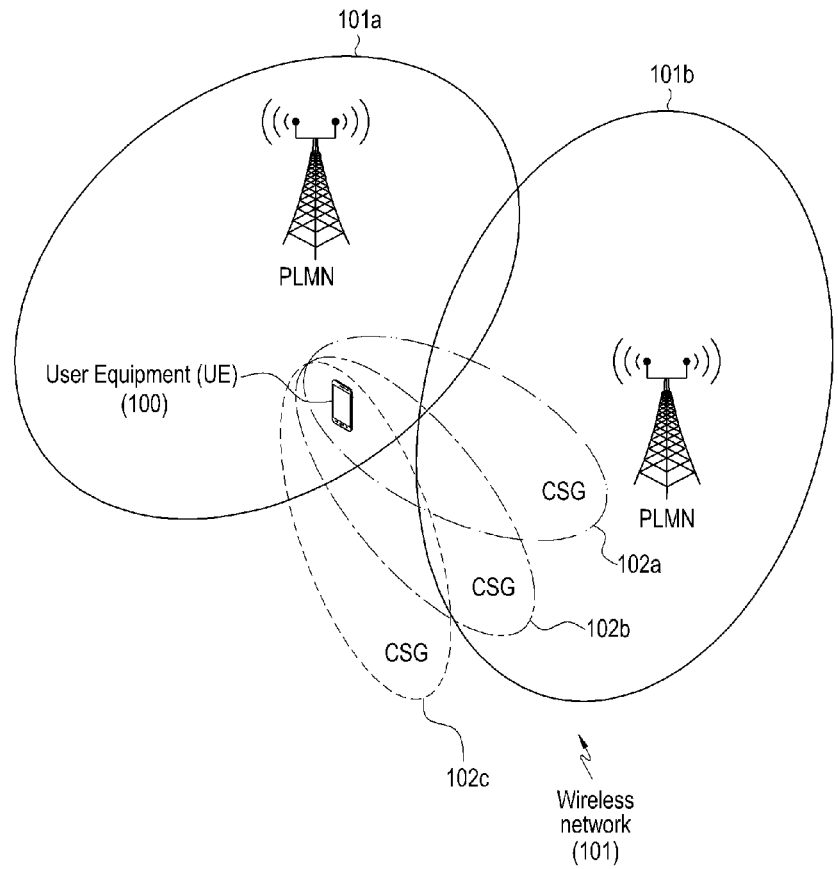
[Fig. 2]
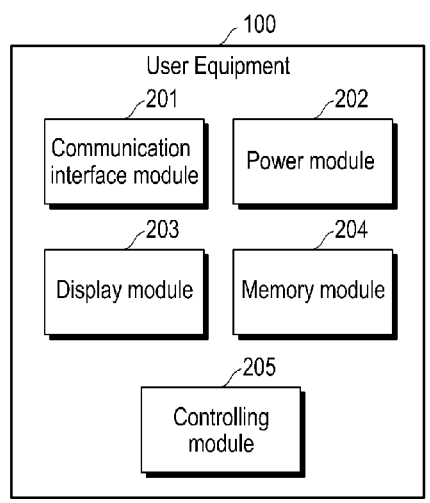

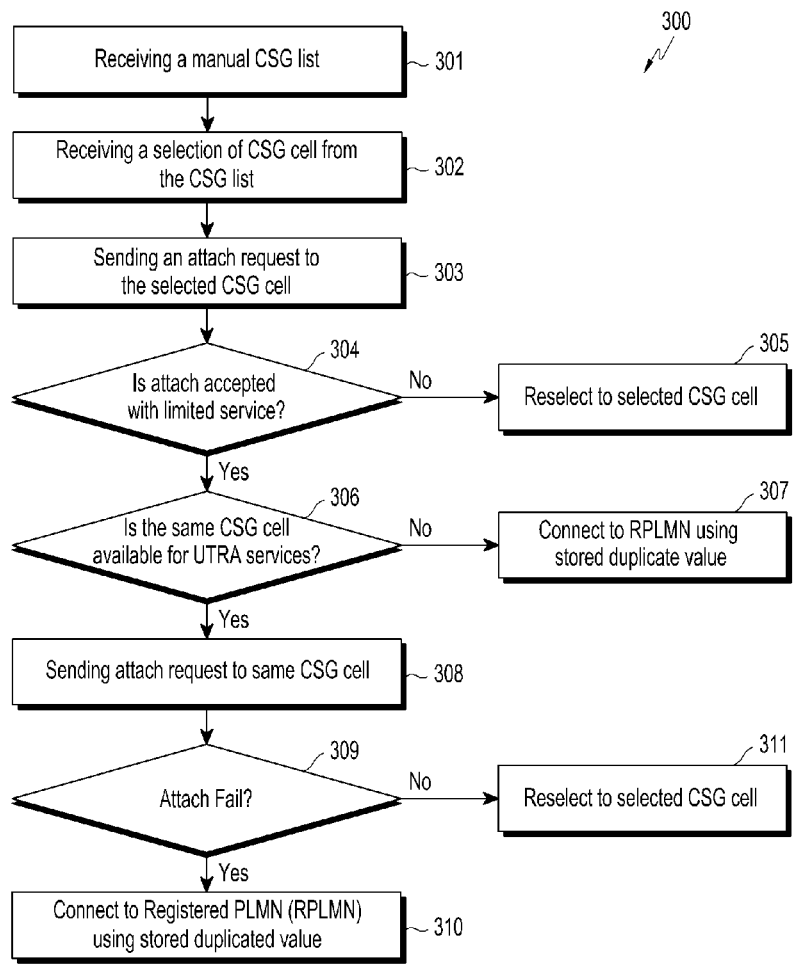

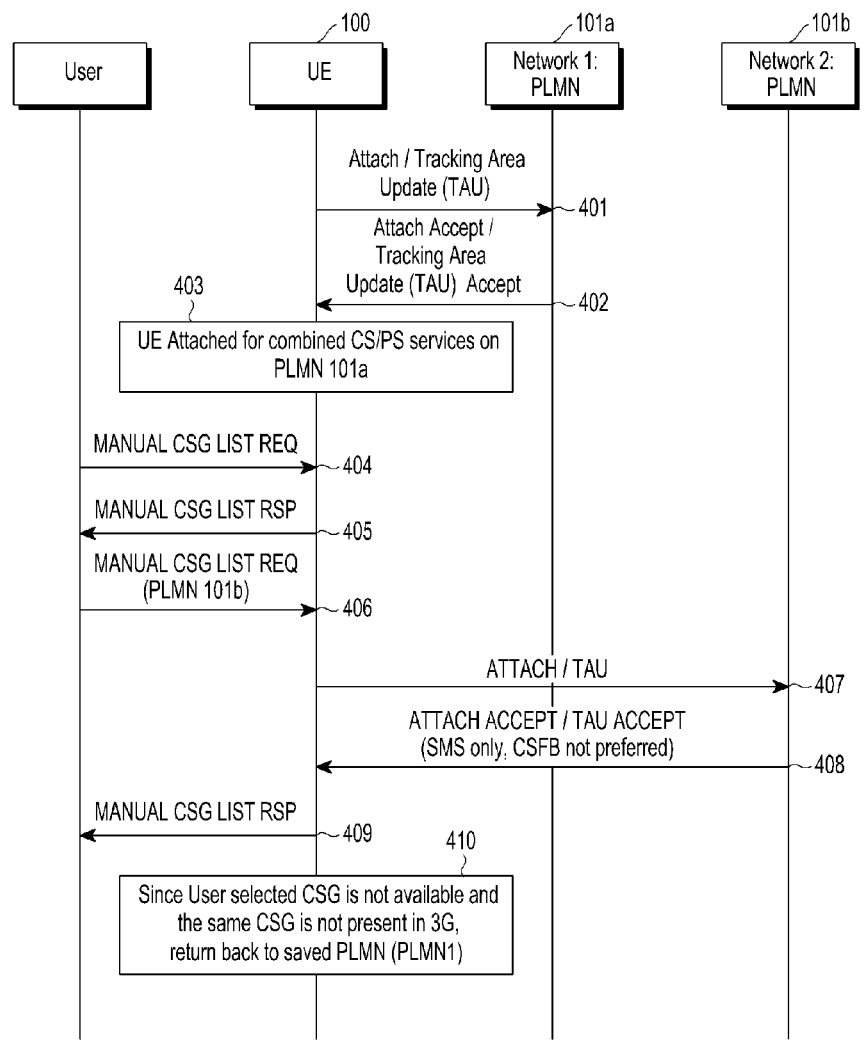
[Fig. 4]

[Fig. 5]
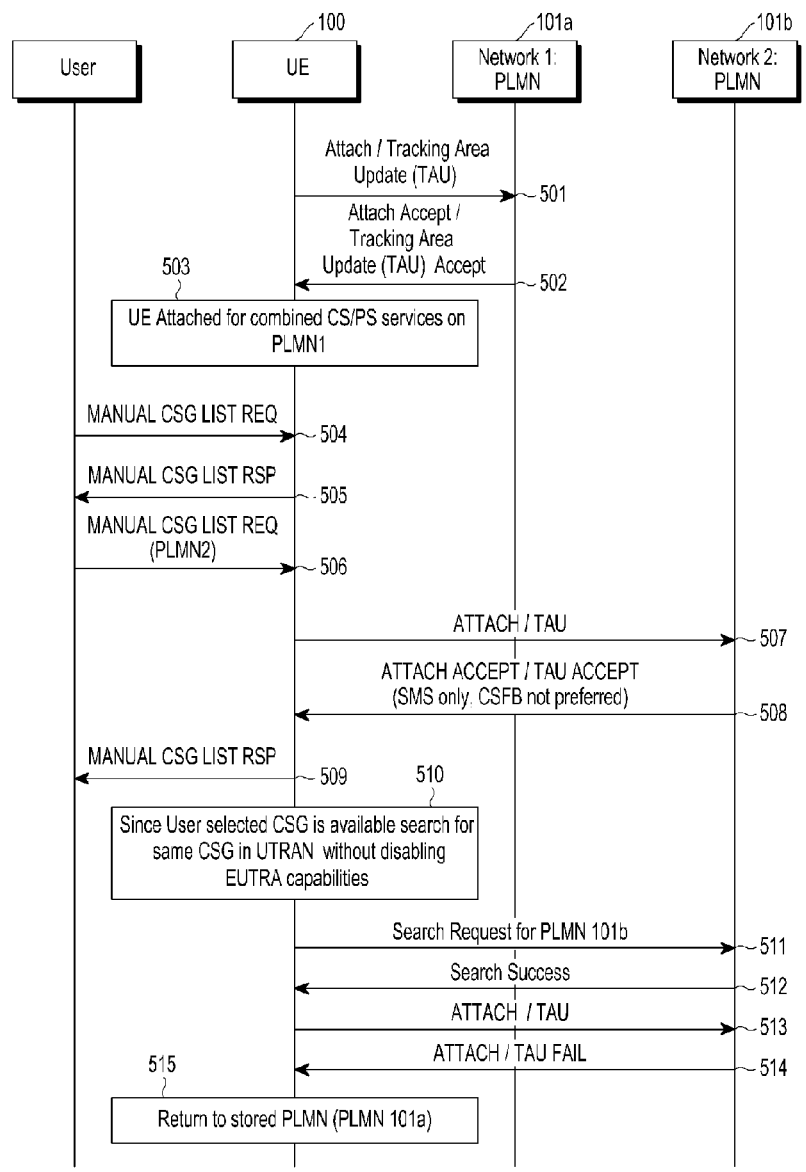
[Fig. 6]
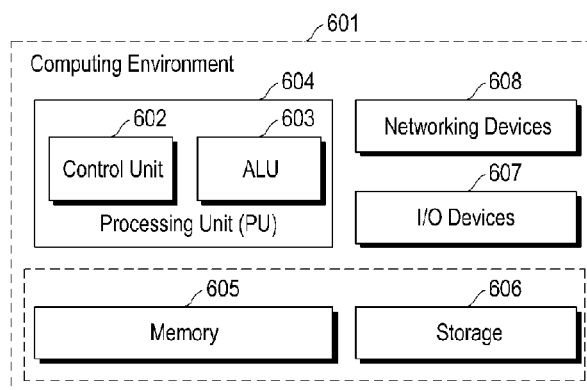

US 9,974,021 B2

METHOD FOR REDUCING BATTERY POWER CONSUMPTION OF USER EQUIPMENT (UE) DURING MANUAL CSG SELECTION

CROSS-REFERENCE TO RELATED APPLICATION(S)

This application is a U.S. National Stage application under 35 U.S.C. § 371 of an International application filed on Jan. 19, 2015 and assigned application number PCT/KR2015/000510, which claimed the benefit of an Indian patent application filed on Jan. 20, 2014 in the Indian Patent Office and assigned Serial number 236/CHE/2014, the entire disclosure of which is hereby incorporated by reference.

TECHNICAL FIELD

The present invention relates to wireless communications and more particularly relates to a method for connecting to Registered Public Land Mobile Network (RPLMN) after receiving a accept message with limited service from a user selected CSG cell during manual CSG selection mode.

BACKGROUND ART

Wireless communication systems are widely deployed for providing various telecommunication services such as telephony, video, data, messaging, broadcasts and so on. Typical wireless communication systems employ multiple-access technologies capable of supporting communication with multiple users by sharing available system resources (for example, bandwidth, transmit power and so on). Examples of such multiple-access technologies include code division multiple access (CDMA) systems, time division multiple access (TDMA) systems and the like. Additionally, the systems can conform to specifications such as third generation partnership project (3GPP), 3GPP long term evolution (LTE).

The 3GPP defines a closed subscriber group (CSG), which identifies subscribers of an operator who are permitted to access a cell (CSG) of a Public Land Mobile Network (PLMN) but which have restricted access (CSG cells). A CSG cell is accessible by the members of the CSG using a CSG identity (CSG ID). In automatic mode of CSG selection, the Access Stratum (AS) layer in the User Equipment (UE) utilizes the White List (combination of Operator CSG list and Allowed CSG list) to reselect or handover to the CSG cell.

The Allowed CSG List can be modified by the operator, or the UE or both. Further, the UE maintains an operator controlled list of allowed CSG identities (Operator CSG list), which are modified only by the operator. The UE uses the Allowed CSG List and Operator CSG list along with the CSG ID broadcast by the CSG for CSG cell selection and reselection.

In manual mode of CSG selection, the UE enables a user to select a CSG ID. For the manual CSG selection, the user shall be able to request the UE to perform a scan for available CSGs. When such request is received from the user, the UE shall perform a scan of available CSGs, CSG identities and their Home Node B (HNB) Names. Further, the available CSGs are displayed to user based on configuration by a Home Public Land Mobile Network (HPLMN) on the Universal Integrated Circuit Card (UICC). Upon manually selecting the CSG cell, the UE behavior is differentiated based on whether the selected CSG belongs to the Registered PLMN (RPLMN) or not.

In the existing system, if the PLMN of the selected CSG is different than the RPLMN, then the UE saves the "current PLMN selection mode" and a duplicate value of RPLMN into a non-volatile memory. Further, upon successful registration on the selected CSG cell, the RPLMN is not updated with that of the selected PLMN.

DISCLOSURE

Technical Problem

In the existing system, when the manual CSG selection is initiated by the user and when the user has selected the PLMN that is different than the RPLMN. The user may receive an attach accept request with limited service from the PLMN of the user selected CSG. Upon receiving the attach accept request with limited service, the UE has to disable the Enhanced Universal Terrestrial Radio Access (EUTRA) capabilities from the RPLMN and starts searching for the same CSG cell for Universal Mobile Telecommunications System (UMTS) Terrestrial Radio Access (UTRA) or GSM Edge Radio Access (GERA) services. When the user selected CSG is not available on UTRA Network (UTRAN or 3G) or GERA Network (GERAN or 2G), then the UE returns to stored duplicate value of RPLMN.

Hence, in the existing system though the user selected CSG cell is not available on UTRAN or GERAN, the UE performs an additional scan for determining the availability of UTRAN or GERAN on the user selected CSG cell. This additional scan on the user selected CSG cell (which is associated with a different PLMN than the RPLMN) will drain the battery power of the UE.

Technical Solution

Accordingly the invention provides a method for connecting to a Registered Public Land Mobile Network (PLMN) after receiving an accept message with at least one limited service from a user selected CSG cell during manual CSG selection mode by a User Equipment (UE), wherein the method comprises receiving a manual CSG list during the manual CSG selection mode by the UE. The method further comprises receiving a selection of CSG cell from the received manual CSG list by the UE. Further, the method comprises connecting to the Registered Public Land Mobile Network (PLMN) after receiving at least one limited service accept message from the user selected CSG cell based on availability of Universal Mobile Telecommunications System (UMTS) Terrestrial Radio Access (UTRA) services in the user selected CSG cell using the information received in the manual CSG list by the UE Accordingly the invention provides a User Equipment (UE) for connecting to a Registered Public Land Mobile Network (PLMN) after receiving an accept message with at least one limited service from a user selected CSG cell during manual CSG selection mode, wherein the UE comprises an integrated circuit. Further the integrated circuit comprises at least one processor and at least one memory. The memory comprises a computer program code within the integrated circuit. At least one memory and the computer program code with the at least one processor cause the UE to receive a manual CSG list during the manual CSG selection mode. Further, the UE is configured to receive a selection of the CSG cell from the received manual CSG list.

The UE is further configured to connect to the Registered Public Land Mobile Network (PLMN) after receiving the at least one limited service accept message from the user selected CSG cell based on availability of Universal Mobile Telecommunications System (UMTS) Terrestrial Radio Access (UTRA) services in the user selected CSG cell using the information received in the manual CSG list.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects

The principal object of the embodiments herein is to a method and system for connecting to a Registered Public Land Mobile Network (RPLMN) after receiving an accept message with limited service from a user selected CSG cell during manual CSG selection mode.

Another object of the invention is to provide a method for ignoring a search on user selected CSG cell for Universal Mobile Telecommunications System (UMTS) Terrestrial Radio Access (UTRA) services based on the availability UTRA services in the user selected CSG cell by a User Equipment (UE) after receiving an accept message with limited service from the user selected CSG cell.

DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates an overview of a wireless network with a plurality of Public Land Mobile Networks (PLMNs) and Closed Subscriber Group (CSG) cells, according to embodiments as disclosed herein;

FIG. 2 illustrates a User Equipment (UE) with various modules, according to the embodiments as disclosed herein;

FIG. 3 is a flow diagram explaining the method of connecting to a Registered PLMN (RPLMN) by the UE after receiving an accept message with limited service from a user selected CSG cell, according to the embodiments as disclosed herein;

FIG. 4 illustrates a sequence diagram explaining the various steps performed by the UE for connecting to the RPLMN after receiving the accept message with limited service from the user selected CSG cell which is identified in UTRAN, according to the embodiments as disclosed herein;

FIG. 5 illustrates a sequence diagram explaining the various steps performed by the UE for connecting to the RPLMN after receiving the accept message with limited service from the user selected CSG cell which is identified in EUTRAN and UTRAN, according to the embodiments as disclosed herein; and FIG. 6 illustrates a computing environment implementing the method for connecting to the Registered Public Land Mobile Network (RPLMN) after receiving the accept message with limited service from a user selected CSG cell by the UE during manual CSG selection mode, according to the embodiments as disclosed herein.

MODE FOR INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for connecting to a Registered Public Land Mobile Network (RPLMN) after receiving an accept message with limited service from a user selected CSG cell (which is associated to a different PLMN than the RPLMN) during manual CSG selection mode by a User Equipment (UE).

In an embodiment, the user selected CSG cell may send an accept message with causes, for example, SMS only, Circuit Switched Fallback (CSFB) not allowed and so on, upon receiving an attach request from the UE. The user selected CSG cell sends an attach accept message with any number of causes that are embedded in the attach accept or Tracking Area Update (TAU) message to the UE.

The method includes connecting to the RPLMN based on the availability of the user selected CSG cell in UTRAN. If the user selected CSG cell is not available in UTRAN, then the method includes connecting to the RPLMN by the UE using a stored duplicate value of the RPLMN.

If the user selected CSG cell is available in UTRAN, then the method includes sending an ATTACH or TAU request to the user selected CSG cell without disabling the EUTRA capabilities from the RPLMN. If the ATTACH or TAU request is failed, then the method includes connecting to the RPLMN using the stored duplicate value of the RPLMN.

In an embodiment, during the manual CSG selection, the UE obtains the manual CSG list response. The manual CSG list response includes PLMN names associated with the CSG cells and the identities of CSG cells (CSG IDs). Further, the CSG list also includes various services supported by the CSG cells as allowed by the network operator. With the manual CSG list response, the UE determines whether a user selected CSG cell is available in UTRAN.

If the user selected CSG cell is available in UTRAN, then the UE attempts to reselect to the user selected CSG cell. If the user selected CSG cell is not available in UTRAN, then the UE is connected to the RPLMN using the stored duplicate value of the RPLMN.

In an embodiment, the UE can be a mobile phone, smart phone, tablet or any other electronic gadget that can communicate with a wireless cellular network.

Referring now to the drawings and more particularly to FIGS. 1 through 6 where similar reference characters denote corresponding features consistently throughout the figures, there are shown preferred embodiments.

FIG. 1 illustrates an overview of a wireless network with a plurality of Public Land Mobile Networks (PLMNs) and Closed Subscriber Group (CSG) cells, according to embodiments as disclosed herein. As depicted in the figure, the wireless network 101 comprises two Public Land Mobile Networks (PLMNs) such as PLMN 101*a* and PLMN 101*b*. In the FIG. 1, Closed Subscriber Group (CSG) cells such as CSG 102*a*, CSG 102*b* and CSG 102*c* are associated with the PLMN 101*b*. A UE 100 is connected to the PLMN 101*a*. The PLMN 101*a* serving the UE 100 is commonly known as Registered PLMN (RPLMN). The RPLMN may provide the services which may include but are not limited to GERA (2G) services, UTRA (3G) services and EUTRA services.

The CSG cells (102*a*, 102*b* and 102*c*) may also provide the GERA (2G) services, UTRA (3G) services and EUTRA (LTE or 4G) services as allowed by the network operator (PLMN 101*b*). When the UE 100 is connected to RPLMN, and if the user of the UE 100 enters the area of CSG cells, the user can reselect to any of the available CSG cells (102*a*, 102*b* and 102*c*) by initiating a manual CSG selection request.

During manual CGS selection, the UE 100 scans all the available CSG cells within the area of the UE 100 and provides a CSG list to the user. The CSG list comprises a plurality of CSG cells along with the services (2G, 3G, 4G) supported by the CSG cells. In an embodiment, when the user initiates a manual CSG selection, the UE 100 scans for the available CSG cells and displays the same to the user. The user may select any of the CSG cell from the CSG list. Then the UE 100 reselects to the user selected CSG cell, when the user selected CSG cell accepts the attach request sent by the UE 100.

In an embodiment, the user selected CSG cell may send an attach accept request message with causes that are embedded in the attach accept request message. The causes may include for example SMS, Circuit Switched Fallback not allowed and so on. These causes in attach accept request message indicates the limited service provided to the UE. When the UE 100 receives the attach accept request message with limited causes, then the UE 100 connects to the RPLMN based on the availability of UTRAN services in the user selected CSG cell.

If the user selected CSG cell is available in UTRAN, then the UE attempts to reselect to the user selected CSG cell. If the user selected CSG cell is not available in UTRAN, then the UE is connected to the RPLMN using the stored duplicate value of the RPLMN.

FIG. 2 illustrates a User Equipment (UE) with various modules, according to the embodiments as disclosed herein. As depicted in the figure, the UE 100 comprises a communication interface module 201, a power module 202, a display module 203, a memory module 204 and a controlling module 205. The communication interface module 201 is configured to connect the UE 100 to the wireless network 101. The power module 202 provides battery information in the UE 100. The battery information comprises the amount of charge that the UE 100 possesses and the time period for which the UE 100 will be in operation and so on. The display module 203 of the UE 100 comprises of a user interface which can be a keypad or through any other means by which a user can interact with the UE 100.

In an embodiment, the display module 203 is configured to display the CSG list to the user. The CSG list comprises a plurality of CSG cells along with the services supported by the CSG cells.

The memory module 204 may include a random access memory (RAM) or another type of dynamic storage device that may store information and instructions, for example an application, for execution by processor, a read-only memory (ROM) device or another type of static storage device. In an embodiment, the memory module 204 is configured to store the duplicate value of the RPLMN (PLMN 101*a*) for connecting to the RPLMN, upon loss of coverage of a user selected CSG cell during manual CSG selection mode.

The controlling module 205 is configured to facilitate access control in the UE 100. In an embodiment, during manual CSG selection mode, the controlling module 205 is configured to obtain the CSG list by scanning the available CSG cells within the area of the UE 100. Further, the various functions of the controlling module 205 are described in FIG. 3.

FIG. 3 is a flow diagram explaining the method 300 for connecting to a Registered PLMN (RPLMN) by the UE after receiving an accept message with limited service from a user selected CSG cell, according to the embodiments as disclosed herein. The method 300 describes the various steps involved in connecting to a Registered PLMN (RPLMN) by the UE 100 after receiving an accept message with limited service from a user selected CSG cell. At step 301, the method 300 includes receiving a manual CSG selection list in the UE 100. In an embodiment, the controlling module 205 is configured to receive the manual CSG list and the display module 203 is configured to display the received manual CSG list to the user.

In an embodiment, the CSG list is displayed to the user along with the PLMN names associated with the CSG cells and the identities of CSG cells (CSG IDs). Further, the CSG list also comprises the various services (2G, 3G and 4G) supported by the CSG cells as allowed by the network operator (PLMN 101*b*).

At step 302, the method 300 includes receiving a selection of a CSG cell from the user. In an embodiment, the display module 203 is configured to receive the selection of the CSG cell from the user. The user may select either the CSG cell associated with the RPLMN (Home PLMN (HPLMN), if available. Also, the user may select the CSG cell which is different from the RPLMN. If the user selects the CSG cell that belongs to a PLMN which is different from RPLMN, then at step 303, the method 300 includes sending an attach request to the user selected CSG cell by the UE 100. In an embodiment, the controlling module 205 is configured to send the attach request to the user selected CSG cell associated with a different PLMN other than the RPLMN.

At step 304, the method 300 includes determining whether the attach request of the UE 100 is accepted with a limited service by the user selected CSG cell. In an embodiment, the user selected CSG cell may accept the attach request of the UE 100 with limited service, for example, SMS only, Circuit Switched Fallback (CSFB) not preferred and so on.

In an embodiment, in response to the attach request received from the UE 100, the user selected CSG cell adds the causes (which indicate the limited service provided to the UE 100) in an attach accept request. There can be any number of causes for the limited service provided by the user selected CSG cell and these causes are embedded in the attach accept request sent to the UE 100 by the user selected CSG cell.

If at step 304, it is determined that the user selected CSG cell has accepted the attach request of the UE 100 without any causes, then at step 305, the method includes reselecting to the user selected CSG cell.

If at step 304, it is determined that the user selected CSG cell has accepted the attach request of the UE with limited service by adding the causes in the attach accept request, then at step 306, the method includes determining whether the same CSG cell as selected by the user is available for UTRA services.

In an embodiment, the controlling module 205 is configured to determine whether the same CSG cell as selected by the user in available for UTRA services.

In an embodiment, the manual CSG list received at step 301 is used for determining whether the same CSG cell as selected by the user is available for UTRA services.

At step 306, if it is determined that the same CSG cell as selected by the user is not available for UTRA services using the CSG list received at step 301, then at step 307, the method includes connecting to the RPLMN by the UE 100 using the stored duplicate value of RPLMN.

Further, at step 307, the method includes ignoring the scan on the user selected CSG cell for determining the availability of UTRA services at the CSG cell. In an embodiment, the controlling module 205 is configured to connect to the RPLMN by ignoring the scan on the user selected CSG cell (since it is determined that the same CSG cell as selected by the user is not available for the UTRA services using the CSG list received at step 301). Hence, at step 307, the method includes connecting to the RPLMN by ignoring the scan on the user selected CSG cell for determining the availability of UTRA services in the same CSG cell for reducing the battery power consumption of the UE 100.

If at step 306, it is determined that same CSG cell is available for UTRA services, then at step 308, the method includes sending an attach request to the user selected CSG cell for obtaining UTRA services by the UE 100.

In an embodiment, the controlling module 205 is configured to send the attach request to the user selected CSG cell for obtaining UTRA services.

At step 309, the method includes determining whether the attach request by the UE is fail. If it is determined that the attach request is failed at step 309, then at step 310, the method includes connecting to the RPLMN using the stored value of RPLMN by the UE 100. In an embodiment, the controlling module 205 is configured to connect to the RPLMN using the stored value of RPLMN in the UE 100.

If at step 309, it is determined that the attach request is success, then at step 311, the method includes reselecting to the user selected CSG cell. In an embodiment, the controlling module 205 is configured to reselect the UE 100 to the user selected CSG cell. The various actions in method 300 may be performed in the order presented, in a different order or simultaneously. Further, in some embodiments, some actions listed in FIG. 3 may be omitted.

FIG. 4 illustrates a sequence diagram explaining the various steps performed by the UE for connecting to the RPLMN after receiving the accept message with limited service from the user selected CSG cell which is identified in UTRAN, according to the embodiments as disclosed herein. As depicted in the sequence diagram, at step 401, the UE 100 is configured to send an ATTACH request or Tracking Area Update (TAU) request to the PLMN 101a for registering with the PLMN 101a. In response to the ATTACH request or TAU request sent by the UE 100, at step 402, the PLMN 101 a sends an ATTACH or TAU ACCEPT request to the UE 100.

When the UE 100 receives the ATTACH or TAU ACCEPT request from the PLMN 101a, at step 403, the UE 100 is attached to the PLMN 101a for obtaining combined Packet Switched (PS) and Circuit Switched (CS) services on PLMN 101a.

At step 404, the user of the UE 100 initiates a MANUAL CSG LIST REQUEST to the UE 100. At step 405, the UE 100 is configured to scan for available CSG cells within the area of the UE 100 and sends a manual CSG list response (MANUAL CSG LIST RSP) to the user. The CSG cells provide only EUTRAN (LTE) services and UTRAN (UMTS or 3G) services are not available in the CSG cells.

At step 406, the user selects a CSG cell (that supports EUTRAN) of a PLMN which is different from the RPLMN (PLMN 101a) of the UE 100 and sends the selected CSG cell in the MANUAL CSG LIST REQUEST to the UE 100.

At step 407, the UE 100 sends an ATTACH request or TAU request to the PLMN of the user selected CSG cell for reselecting to the user selected CSG cell.

In response to the ATTACH request or TAU request received from the UE 100, at step 408, the user selected CSG cell may send an ATTACH ACCEPT request message with limited service to the UE 100. In the ATTACH ACCEPT message, the user selected CSG cell incorporate the cause(s), such as SMS only, CSFB not preferred and so on.

Further, at step 409, the UE 100 is configured to display the limited service accept message with causes received from the user selected CSG cell to the user in the MANUAL CSG LIST RSP message. In an embodiment, the display module 203 is configured to display the cause to the user.

When the UE 100 receives the limited service accept message from the user selected CSG cell and the same CSG cell is not available in UTRAN (as indicated to the user in the MANUAL CSG LIST RSP message at step 405), the UE 100 is configured to connect to RPLMN using the stored duplicate value of RPLMN.

At step 410, the UE 100 is configured to connect to RPLMN using the stored duplicate value of RPLMN. Further, at step 410, the UE 100 is configured to ignore a scan for searching the same CSG cell on UTRAN (as the same CSG cell is not available for providing UTRAN (3G) service, which is indicated to the user in MANUAL CSG LIST RSP message at step 405). Hence the battery power consumption of the UE 100 is reduced by ignoring the scan on the same CSG cell for determining the availability of UTRA services.

The UE 100 is configured to connect to the RPLMN without scanning on the same CSG cell (for UTRA services) using the stored duplicated value of the RPLMN for reducing the battery power consumption.

FIG. 5 illustrates a sequence diagram explaining the various steps performed by the UE for connecting to the RPLMN after receiving the accept message with limited service from the user selected CSG cell which is identified in EUTRAN and UTRAN, according to the embodiments as disclosed herein. As depicted in the sequence diagram, at step 501, the UE 100 is configured to send an ATTACH or Tracking Area Update (TAU) request to the PLMN 101a for registering with the PLMN 101a. In response to the ATTACH request or Tracking Area Update (TAU) request sent by the UE 100, at step 502 the PLMN 101 a sends an ATTACH request or TAU ACCEPT request to the UE 100.

When the UE 100 receives the ATTACH or TAU ACCEPT request from the PLMN 101a, at step 503, the UE 100 is attached to the PLMN 101a for obtaining combined Packet Switched (PS) and Circuit Switched (CS) services on PLMN 101a.

At step 504, the user of the UE 100 initiates a MANUAL CSG LIST REQUEST to the UE 100. At step 505, the UE 100 is configured to scan for available CSG cells within the area of the UE 100 and sends a MANUAL CSG LIST RESPONSE to the user., The CSG cells provide both EUTRAN services (LTE or 4G) and UTRAN (UMTS or 3G) services.

At step 506, the user selects a CSG cell (that supports EUTRAN) of a PLMN which is different from the RPLMN (PLMN 101a) of the UE 100 and sends the selected CSG cell in the MANUAL CSG list request to the UE 100.

At step 507, the UE 100 sends an ATTACH request or TAU request to the PLMN of the user selected CSG cell for reselecting to the user selected CSG cell.

In response to the ATTACH request or TAU request received from the UE 100, at step 508, the user selected CSG cell may send an ATTACH ACCEPT message with limited service to the UE 100. In the ATTACH ACCEPT message, the user selected CSG cell incorporates the cause(s), such as SMS only, CSFB not preferred and so on.

Further, at step 509, the UE 100 is configured to display the limited service accept message with causes received from the user selected CSG cell to the user in the MANUAL CSG LIST RSP message. In an embodiment, the display module 203 is configured to display the cause to the user.

When the UE 100 receives the limited service accept message from the user selected CSG cell and the same CSG cell is available in UTRAN (as indicated to the user in the MANUAL CSG LIST RSP at step 505), at step 510, the UE 100 is configured to initiate a search on the same CSG cell for UTRAN without disabling EUTRA capabilities from the RPLMN.

At step 511, the UE 100 is configured send a search request for PLMN 102b for obtaining UTRA services from same CSG cell as selected by the user. Since the same CSG cell is identified on UTRAN in the manual CSG LIST response that is displayed to the user at step 505, at step 512, the UE 100 obtains a search success message from the PLMN 102b as shown in the figure.

Further, at step 513, the UE 100 is configured to send an ATTACH request or TAU request to the user selected CSG cell associated with the PLMN 102b. At step 514, the ATTACH or Tracking Area Update (TAU) request sent by the UE 100 for obtaining the UTRA services from the same user CSG cell as selected by the user is failed.

When the ATTACH request or Tracking Area Update (TAU) request sent by the UE is failed, at step 515, the UE is configured to connect to the RPLMN using the stored duplicate value of RPLMN (PLMN 101a).

FIG. 6 illustrates a computing environment implementing the method for connecting to Registered Public Land Mobile Network (RPLMN) after receiving the accept message with limited service from a user selected CSG cell by the UE during manual CSG selection mode, according to the embodiments as disclosed herein. As depicted the computing environment 601 comprises at least one processing unit 604 that is equipped with a control unit 602 and an Arithmetic Logic Unit (ALU) 603, a memory 605, a storage unit 606, plurality of networking devices 608 and a plurality Input output (I/O) devices 607. The processing unit 604 is responsible for processing the instructions of the algorithm. The processing unit 604 receives commands from the control unit in order to perform its processing. Further, any logical and arithmetic operations involved in the execution of the instructions are computed with the help of the ALU 603.

The overall computing environment 601 can be composed of multiple homogeneous and/or heterogeneous cores, multiple CPUs of different kinds, special media and other accelerators. The processing unit 604 is responsible for processing the instructions of the algorithm. Further, the plurality of processing units 604 may be located on a single chip or over multiple chips.

The algorithm comprising of instructions and codes required for the implementation are stored in either the memory unit 605 or the storage 606 or both. At the time of execution, the instructions may be fetched from the corresponding memory 605 and/or storage 606, and executed by the processing unit 604.

In case of any hardware implementations various networking devices 608 or external I/O devices 607 may be connected to the computing environment to support the implementation through the networking unit and the I/O device unit.

The embodiments disclosed herein can be implemented through at least one software program running on at least one hardware device and performing network management functions to control the elements. The elements shown in FIGS. 2, 4, 5 and 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for connecting to a registered public land mobile network (RPLMN) by a user equipment (UE), the method comprising:
    initiating a manual closed subscriber group (CSG) selection;
    storing a duplicate value of the RPLMN which was in use before the initiating;
    obtaining a user selected CSG cell of a public land mobile network (PLMN) which is different from the RPLMN;
    registering on the user selected CGS cell in the PLMN;
    connecting to the PLMN corresponding to the user selected CSG in response to a successful registration on the user selected CSG;
    receiving, by the UE, an accept message from the connected PLMN; and
    reconnecting to the RPLMN using the duplicate value, when the accept message includes information that an evolved universal mobile telecommunications system (UMTS) terrestrial radio access (EUTRA) capability of the UE is disabled according to the registration with the user selected CSG, and the user selected CSG cell is not available on UMTS terrestrial radio access (UTRA) services.

2. The method as in claim 1, further comprising, receiving a manual CSG list including a plurality of CSG cells along with services supported by the plurality of CSG cells during the manual CSG selection mode,
    wherein the services supported by the plurality of CSG cells comprises at least one of: global system for mobile communication edge radio access (GERA) services, the UTRA services, or EUTRA services.

3. The method as in claim 1, wherein the RPLMN provides at least one of: the global system for mobile communication edge radio access (GERA) services, the UTRA services, and the EUTRA services.

4. The method as in claim 1, wherein reconnecting to the RPLMN further comprises, ignoring search on the user selected CSG cell for determining availability of the UTRA services in the user selected CSG cell, if the UTRA services are not available in the user selected CSG cell, after receiving an accept message with the at least one limited service by the UE.

5. The method as in claim 1, wherein reconnecting to the RPLMN further comprises sending an attach request message without disabling the EUTRA services from the RPLMN by the UE, when the user selected CSG cell is available for the UTRA services during the manual CSG selection mode.

6. The method as in claim 5, wherein reconnecting to the RPLMN comprises connecting to the RPLMN after receiving an attach fail message from the user selected CSG cell, when the user selected CSG cell is available for the UTRA services.

7. The method as in claim 1, wherein obtaining the user selected CSG cell includes receiving a manual CSG list during a manual selection mode and obtaining the user selected CSG cell in the manual CSG list.

8. The method as in claim 1, further comprising receiving the accept message which specifies that the user selected CSG provides the at least one limited service to the UE.

9. A user equipment (UE) for connecting to a registered public land mobile network (RPLMN), the UE comprising:
an integrated circuit comprising at least one processor; and
at least one memory having a computer program code therein,
wherein the at least one processor, upon execution of the computer program code, is configured to:
initiate a manual closed subscriber group (CSG) selection,
store a duplicate value of a RPLMN which was in use before the initiating,
obtain a user selected the CSG cell of a public land mobile network (PLMN) which is different from the RPLMN,
register on the user selected CGS cell in the PLMN,
connect to the PLMN corresponding to the user selected CSG in response to a successful registration on the user selected CSG,
receive, from the connected PLMN, an accept message, and
reconnect to the RPLMN, using the duplicate value, when the accept message includes information that an evolved universal mobile telecommunications system (UMTS) terrestrial radio access (EUTRA) capability of the UE is disabled according to the registration, and the user selected CSG cell is not available on UMTS terrestrial radio access (UTRA) services.

10. The UE as in claim 9,
wherein the UE is configured to receive a manual CSG list including a plurality of CSG cells along with services supported by the plurality of CSG cells, during the manual CSG selection mode, and
wherein the services supported by the plurality of CSG cells comprises at least one of: global system for mobile communication edge radio access (GERA) services, the UTRA services, or EUTRA services.

11. The UE as in claim 9, wherein the UE is configured to, if the UTRA services are not available in the user selected CSG cell, to ignore search on the user selected CSG cell for determining availability of the UTRA services in the user selected CSG cell after receiving an accept message with the at least one limited service.

12. The UE as in claim 9, wherein the UE is further configured to send an attach request message without disabling the EUTRA services from the RPLMN, when the user selected CSG cell is available for the UTRA services during the manual CSG selection mode.

13. The UE as in claim 12, wherein the UE is configured to connect to the RPLMN after receiving an attach fail message from the user selected CSG cell, when the user selected CSG cell is available for the UTRA services.

14. The UE as in claim 9, wherein the UE is configured to receive a manual CSG list during a manual selection mode and obtain the user selected CSG cell in the manual CSG list.

15. The UE as in claim 9, wherein the UE is further configured to receive the accept message which specifies that the user selected CSG provides the at least one limited service to the UE.

* * * * *